No. 877,481. PATENTED JAN. 28, 1908.
O. S. BEYER.
TRANSMISSION MECHANISM.
APPLICATION FILED JUNE 5, 1906.
2 SHEETS—SHEET 1.
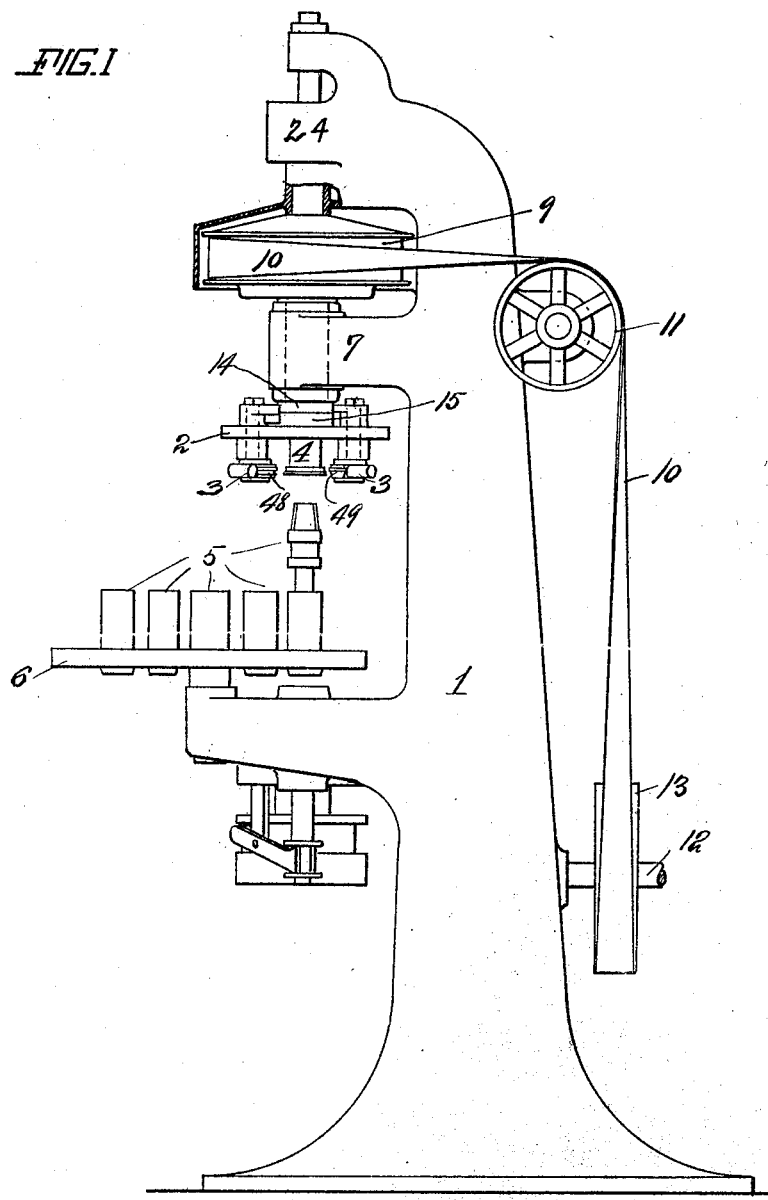

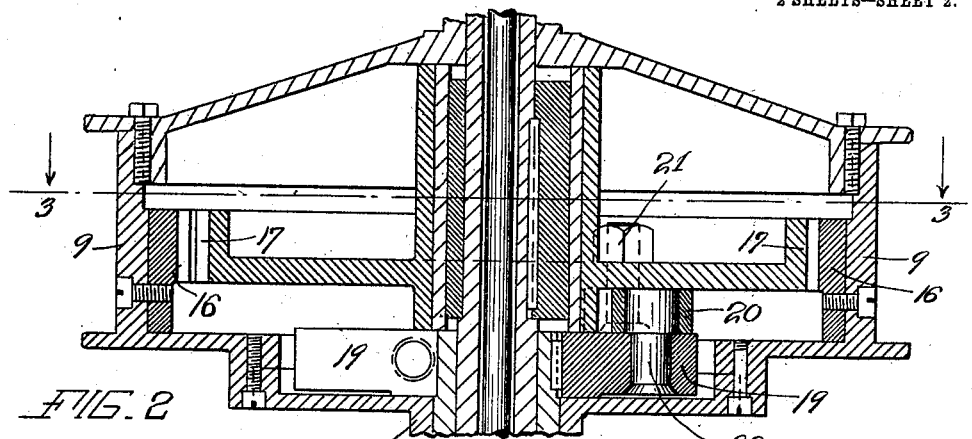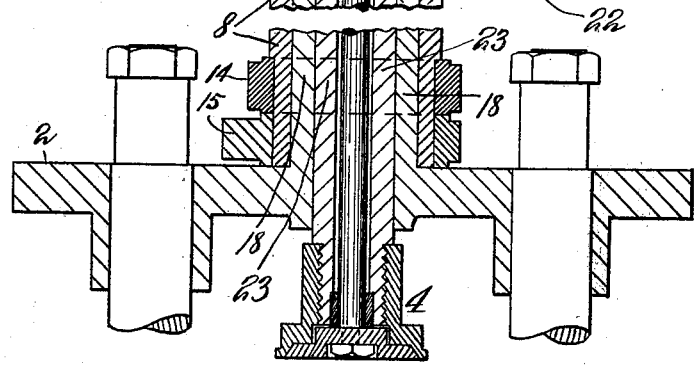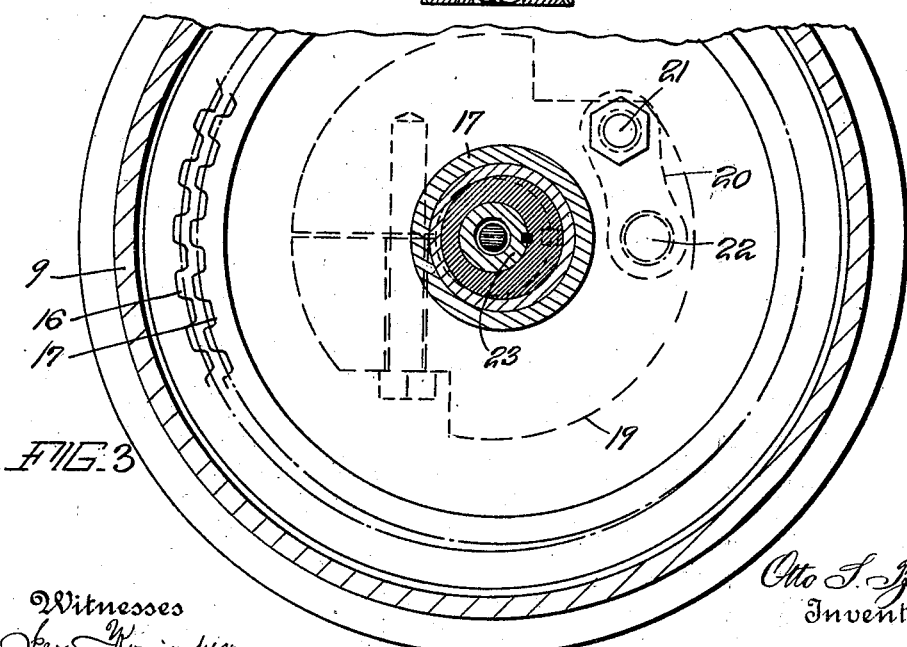

UNITED STATES PATENT OFFICE.

OTTO S. BEYER, OF EAST RUTHERFORD, NEW JERSEY, ASSIGNOR TO E. W. BLISS COMPANY, A CORPORATION OF WEST VIRGINIA.

TRANSMISSION MECHANISM.

No. 877,481.   Specification of Letters Patent.   Patented Jan. 28, 1908.

Application filed June 5, 1906. Serial No. 320,262.

*To all whom it may concern:*

Be it known that I, OTTO S. BEYER, a citizen of the United States of America, and a resident of East Rutherford, Bergen county, New Jersey, have invented certain new and useful Improvements in Transmission Mechanism, of which the following is a specification.

The present invention relates generally to transmission mechanism, and has more particularly reference to mechanism for driving a plurality of members at differential speeds.

The object of the invention is to produce a compact and attractive structure, less bulky and complicated than devices heretofore used for this purpose, and the improvement resides chiefly in mounting a plurality of shafts, one within the other and in providing suitable differential transmission mechanism in connection therewith.

The invention further consists in other features of construction, combination of parts, and arrangement of elements more fully hereinafter described.

In the accompanying drawings, the invention has been embodied in a concrete and preferred form, shown applied to a seaming machine, but the particular means used to effect the various improvements may be varied without departing from the spirit of the invention.

In the said drawings: Figure 1 is a side elevation of a machine embodying the invention, shown partly in section. Fig. 2 is a sectional detail view of the transmission mechanism shown in Fig. 1. Fig. 3 is a transverse sectional view on line 3—3 of Fig. 2.

Similar characters of reference indicate corresponding parts in the different views.

1 indicates a framework of any suitable construction for properly supporting the parts.

2 is the seamer head and 3 the seaming members.

4 is the chuck or clamp.

5 indicates a plurality of work supporters mounted on the rotatable dial 6 in a well known manner. The framework carries a bracket 7 supporting a hollow shaft 8 provided with suitable driving means such as the hollow pulley 9 to which motion is imparted by means of the belt 10 passing over the idlers 11 and receiving its motion from the shaft 12 carrying the pulley 13. The shaft 8 is provided with suitable means, in the present instance the cams 14 and 15, for causing the seaming members to move in and out in the usual manner.

Mounted on the hollow pulley 9 is a concentrically disposed internal gear 16 with which meshes the eccentrically disposed external gear 17.

18 is a shaft located inside of the shaft 8 and carrying the seamer head 2. Mounted on this shaft 18 is a concentric member 19 in the present instance in the form of a disk, and means are provided whereby this disk or member 19 is driven from the eccentrically disposed external gear 17 preferably taking the form of a link 20 attached to the gear 17 and member 19 by means of the bolts or studs 21 and 22. Located inside the shaft 18 is a spindle 23 carrying the chuck or clamp 4, the said spindle being supported in the bracket 24 of the framework.

As previously indicated, the seamer head 2 carries the seaming members 3. These seaming members in the present instance consist of the curling roll 48 and the finishing roll 49.

The rotation of the pulley 9 causes the rotation of the hollow shaft 8 and by this means the rotation of the cams 14 and 15 acting respectively on the curling and finishing rolls to move the same successively toward and away from the work. Owing to the fact that the gear 17 is in mesh with the gear 16, motion is further imparted to the shaft 18 and from thence to the seamer head 2.

The arrangement of the parts in the present instance, is such, however, that the seamer head makes about thirty revolutions to each twenty-nine revolutions of the cams 14 and 15 whereby the seaming operation will be effected properly. It will of course be understood that if the cams 14 and 15 on the seamer head are rotated at the same speed as the seamer head, no effect would be produced inasmuch as the said seaming members travel around with the said seamer head. The difference in speed between the cams 14 and 15 noted here need not of course be followed exactly, but is used only for the sake of illustration.

What is claimed is.

1. The combination of two shafts arranged concentrically one within the other, driving means on the outer shaft an internal gear moving with the said outer shaft, an eccentrically mounted external gear meshing with the internal gear, a concentric member on the inner shaft, and means for driving the said concentric member from the said eccentric gear.

2. The combination of two shafts arranged concentrically one within the other, driving means on the outer shaft, an internal gear moving with the said outer shaft, an eccentrically mounted external gear meshing with the internal gear, a concentric member on the inner shaft, and a loose connection between the eccentrically disposed gear and the said concentric member.

Signed at New York city this 1st day of June 1906.

OTTO S. BEYER.

Witnesses:
 MOSES ARONSON,
 AXEL V. BEEKEN.